United States Patent Office 3,280,049
Patented Oct. 18, 1966

3,280,049
PREMIXES FOR POLYURETHANE FOAMS
John E. Hyre, South Charleston, and Friso G. Willeboordse, St. Albans, W. Va., assignors to Union Carbide Corporation, a corporation of New York
No Drawing. Filed Nov. 29, 1963, Ser. No. 327,052
7 Claims. (Cl. 260—2.5)

The instant invention is directed to the improved stabilization of polyols. More particularly this invention is directed to the stabilization of polyether polyols and metallo-organic urethane catalysts. Specifically the invention is concerned with novel urethane premix compositions demonstrating superior oxidative stability.

Polyether polyols have found widespread use in urethane applications particularly in the production of cellular urethane plastics. These cellular foams are produced by the reaction of an organic polyisocyanate with the polyol, and at times water, in the presence of catalysts. These catalysts serve to control the reactions at such rates that the foam rises and cures sufficiently fast to prevent collapse of the foam. The gas evolution and polymer growth must be matched so that the gas is trapped efficiently and the polymer has the proper strength at the end of the gas evolution to maintain its volume without collapse or rupture.

A wide variety of catalysts are used to control the urethane reactions. In practice tertiary amines in conjunction with divalent metal catalysts such as stannous octoate are widely employed. Thus, stannous catalysts are premixed with the active hydrogen-containing reactant, for example the polyether polyol, for producing "one-shot" foam. However, the characteristic etheric oxygen in the backbone of the polyether polyols render these compounds extremely susceptible to oxidative decomposition through a hydroperoxide intermediate. In this environment the stannous ion is easily oxidized to the tetravalent state consequently destroying the activity and impairing the regulatory catalytic effect of the stannous moiety.

In accordance with this invention there is provided a polyether polyol premix in which the stannous ion does not suffer deleteriously from oxidation although kept in the premix state for extended periods of time. The present invention is predicated upon the discovery that the stannous ions may be remarkably stabilized against oxidation in a polyether polyol environment by the addition of a small stabilizing amount of 2,2'-methylene bis(4-methyl-6-tertiarybutylphenol).

It is accordingly an object of this invention to provide novel oxidatively and thermally stable polyether polyols. It is a further object of this invention to provide urethane premixtures containing a polyether polyol and a stannous catalyst. A further object of this invention is to provide such premixtures which may be stored over prolonged periods of time without adversely affecting the foam product. A still further object of this invention is to provide uniform cellular urethane plastic products from a premixed catalyst-polyol system.

Although 2,2'-methylene bis(4-methyl-6-tertiarybutylphenol) has been used as an antioxidant in various applications, it has been found that it is singularly effective and has significant advantages over other known antioxidants even of the same basic structure, to shield the stannous ion from oxidation in a polyether polyol environment.

The polyether polyols which are useful in the production of polyurethane foams and consequently which are contemplated by the instant invention include the polyoxyalkylene glycols such as diethylene glycol, dipropylene glycol, tetraethylene glycol and the higher alkyleneoxy polyols including polyethylene glycol, polypropylene glycol, poly(mixed oxyethylene oxypropylene) glycol, as well as ethylene oxide and propylene oxide adducts of polyfunctional alcohols and of polyfunctional amines such as pentaerythritol, glycerol, sorbitol, mannitol, 2,2,6,6-tetrakis(hydroxymethyl)cyclohexanol, ethylene diamine, triethanolamine and the like, the polyoxybutylene glycols including polybutylene glycol prepared from 3,4-epoxybutane and 2,3-epoxybutane as well as poly(oxy-1,4-butylene)glycol prepared from tetrahydrofuran.

The 2,2'-methylene bis(4-methyl-6-tertiarybutylphenol) is preferably added in small amounts sufficient to inhibit the oxidation of the stannous moiety. Generally the 2,2'-methylene bis(4-methyl-6-tertiarybutylphenol) can be present in amounts ranging from 50 to 5000 parts per million, and preferably from 200 to 2000 parts per million by weight based upon the polyol. The method of introduction of the additive is not critical and simple addition with stirring will suffice. In the event that heating is required to solubilize the additive, the addition can be advantageously carried out under a nitrogen atmosphere to preclude any oxidation of the polyether polyol.

The urethane premixes stabilized in accordance with this invention are preferably formulated by addition of the stannous catalyst to the stabilized polyol already containing the additive. The amount of stannous catalyst to be employed will, of course, vary according to the particular polyol and isocyanate employed, and the final foam product desired. Generally, foam formulations utilize from 0.05 to 2.0 percent of catalyst based upon the polyol. It is pointed out that the stannous catalysts may be used in conjunction with tertiary amines or with other metal catalysts such as lead catalysts which are well known in the art, and accordingly premix compositions comprising polyether polyols with stannous catalysts in combination with other catalysts are deemed within the scope of the invention.

The stannous catalysts commonly employed in foam formulations are contemplated in the stabilized urethane premixtures of the instant invention. These catalysts include the stannous salts of monocarboxylic acids and stannous salts of aminomonocarboxylic acids, such as stannous acetate, stannous hexanoate, stannous octoate, stannous laurate, stannous oleate, stannous glycinate, stannous aminopropionate and the like. Stannous octoate is preferred.

In addition to 2,2'-methylene bis(4-methyl-6-tertiarybutylphenol) the compositions of the instant invention may contain other standard additives such as phosphoric acid, 2,6-ditertiarybutyl-p-cresol, phenylalphanaphthylamine, allo-ocimene, chrysene and the like. Such other additives will cooperate with 2,2'-methyl bis(4-methyl-6-tertiarybutylphenol), however, such additives alone cannot effectively shield the stannous material in the polyol from oxidation and are but ancillary in effect to the primary additive. A premix composition having outstanding resistance to oxidation can be formulated using an antioxidant system of 2,2'-methylene bis(4-methyl-6-tertiarybutylphenol) together with 2,6-ditertiarybutyl-p-cresol. In such a system the latter compound is generally present in small amounts of from about 200 to 1500 parts per million based on the polyol.

Another additive which most efficaciously complements 2,2'-methylene bis(4-methyl-6-tertiarybutylphenol) in preventing the oxidation of stannous ions in polyurethane foam premix compositions is ascorbic acid. The additive combination of 2,2'-methylene bis(4-methyl-6-tertiarybutylphenol) and ascorbic acid in fact yields an additive system which is very successful in maintaining the activity of the stannous catalyst. When employed in conjunction with 2,2'-methylene bis(4-methyl-6-tertiarybutylphenol) the ascorbic acid is generally present in an amount ranging from 25 to 800 parts per million based upon the polyol. More preferably from about 50 to about 500 parts per million ascorbic acid based upon the polyol are used. However, it is preferable in all instances when this particular combination is employed that ascorbic acid not be present in excess of the amount of 2,2'-methylene bis(4-methyl-6-tertiarybutylphenol) in the premix.

The premix compositions of this invention may also comprise the other components which are well known for use in the production of cellular urethane polymers. Accordingly, the premix compositions may contain, in addition to the polyether polyol and the additive of this invention, an emulsifier such as a silicone, water or a halocarbon blowing agent or a mixture of both. These formulations are well known in the art. Accordingly, the premix compositions of this invention comprise a polyether polyol, a stannous catalyst and the 2,2'-methylene bis(4-methyl-6-tertiarybutylphenol) and also may include such other catalyst or other ingredients as are otherwise required.

The singular effectiveness of 2,2'-methylene bis(4-methyl-6-tertiarybutylphenol) in maintaining the activity of the stannous catalyst and improving the premix stability of the polyol-stannous mixtures is postulated to be its combination of antioxidant and chelating properties. This additive, 2,2'-methylene bis(4-methyl-6-tertiarybutylphenol), exerts a configurational environment upon the stannous catalyst which is excellent in antioxidative character, yet weak enough in chelation properties so as not to diminish the catalytic activity of the stannous ion by coordination. Too strong a chelating agent could effectively impair the activity of the stannous catalyst by coordination, and have an effect similar to the oxidation to the stannic state, the avoidance of which is the purpose of the instant invention.

For purposes of determining premix stability of a number of polyol-stannous systems employing various antioxidants, mixtures were made comprising the propylene oxide adduct of glycerol having a hydroxyl number of 56 and 0.4 part per hundred of polyol of stannous octoate. In premix stability studies the catalyst activity of stannous octoate is determined by way of its influence upon the hydroxyl-isocyanate reaction between the polyol with which the stannous octoate is premixed, and phenyl isocyanate.

The actual method used is based upon a spectrophotometric measurement of the decrease in phenyl isocyanate concentration in the reaction mixture by means of the isocyanate peak at about $4.42\mu$ in the infrared region. The rate of consumption of isocyanate is a direct measure of the actual catalyst activity in the premixed system and provides conclusive evidence which correlates to the amount of oxidation undergone by the stannous catalyst after premixing. The spectrophotometric measurement of the polyol premix is made after premixing periods of 0, 1, 24 and 72 hours.

In order to have the decrease in isocyanate concentration solely related to reactivity, it has been found to be a requisite with relatively high catalyst concentrations to employ dimethylformamide-toluene as solvent and a deficient amount of phenyl isocyanate with reference to hydroxyl-equivalent.

The amounts used in the spectrophotometric determination were invariably:

(a) $8.5 \times 10^{-3}$ equivalents of polyol, in which 0.04 gram ($1 \times 10^{-4}$ moles) of stannous octoate were premixed.
(b) $4.6 \times 10^{-3}$ equivalents of phenyl isocyanate, i.e., 0.50 ml.
(c) 5 milliliters anhydrous dimethylformamide
(d) approximately 35 milliliters of redistilled toluene, i.e., the amount necessary to dilute to the mark of a 50 milliliter volumetric flask.

The sample, placed in a 0.1 mm. cell with calcium fluoride windows, is scanned between 4.3 and 4.6 microns at intervals of about 10 minutes. The absorbance readings nearest to 1.0 and 0.4 are taken as reference points for evaluation of rate of isocyanate consumption, i.e., reactivity of polyol-stannous octoate premix. No correction for blank has to be made since the determination is based upon a difference in absorbance during the period of measurement.

In order to demonstrate the singular efficacy of 2,2'-methylene bis(4-methyl-6-ditertiarybutylphenol) representatives from various classes of antioxidants were studied. The following classes of compounds were studied:

A. Triply connected organophosphorus compounds and related antioxidants
B. Highly conjugated compounds
C. Condensed nuclear hydrocarbons
D. Substituted methylene bisphenols The results appear in Table I, whereas the premix stability studies of some selected antioxidants during extended periods of time are shown in Table II.

TABLE I.—REACTIVITY AND PREMIX STABILITY OF UNSTABILIZED "NIAX" TRIOL LG-56 ONE GRADE IN THE PRESENCE OF SEVERAL ADDITIVES

[Stannous Octoate 0.4 php.]

| Additive | P.p.m. | Activity $\times 10^2$ in min.$^{-1}$ after— | | | |
|---|---|---|---|---|---|
| | | 0 hr. premix time | 1 hr. premix time | 24 hrs. premix time | 72 hrs. premix time |
| None | | 2.7 | 2.4 | 1.8 | 1.2 |
| Class A: | | | | | |
| Triphenylphosphine oxide | 1,390 | 1.8 | 1.1 | 0.9 | 0.8 |
| Triphenyl phosphite | 1,400 | 1.9 | 1.3 | 1.1 | 0.9 |
| Methyl diphenyl phosphite | 1,170 | 2.0 | 1.4 | 1.1 | 0.9 |
| Butyl diphenyl phosphate | 1,270 | 2.0 | 1.4 | 1.1 | 0.9 |
| O,O,O-Triisooctyl phosphorothioate | 1,090 | 1.8 | 1.1 | 0.8 | 0.7 |
| Class B: Allo-ocimene [1] | 970 | 4.0 | 3.5 | 3.1 | 2.4 |
| Class C: | | | | | |
| Fluorene | 1,060 | 2.0 | 1.8 | 1.6 | 0.9 |
| Chrysene | 1,130 | 2.3 | 2.1 | 1.8 | 1.0 |
| Phenyl-alpha-naphthylamine | 1,030 | 4.1 | 2.9 | 2.5 | 1.8 |
| Class D: | | | | | |
| 2,6-ditertiarybutyl-p-cresol | 960 | 3.3 | 2.9 | 2.4 | 1.7 |
| 1,1,3-tris(2-hydroxy-5-methylbenzene) propane | 800 | 3.6 | 3.1 | 2.7 | 1.8 |
| 2,2'-methylene bis(4-methyl-6-tertiary-butylphenol) | 990 | 4.2 | 3.9 | 3.6 | 3.3 |
| 4,4'-methylene bis(2,6-ditertiary-butylphenol) | 1,040 | 3.7 | 3.3 | 2.9 | 2.1 |

[1] Allo-ocimene-2,6-dimethyl-2,6-dimethyl-2,4,6-octatriene.

TABLE II.—PREMIX STABILITY STUDIES DURING EXTENDED PERIODS OF TIME

| Catalyst [1] | Additive | Activity ×10² in min.⁻¹ after— | | |
|---|---|---|---|---|
| | | 3 days premix time | 14 days premix time | 30 days premix time |
| php. SnOct | Allo-ocimene, 970 p.p.m | 2.4 | 1.5 | 0.9 |
| php. SnOct | PANA,[2] 1,030 p.p.m | 1.8 | 1.2 | 0.7 |
| php. SnOct | Antioxidant 2246,[3] 990 p.p.m | 3.3 | 2.5 | 2.0 |
| php. SnOct | Antioxidant 4426,[4] 1,040 p.p.m | 2.1 | 1.4 | 1.0 |
| php. Stannous Catalyst A [5] | None | 3.0 | 2.1 | 1.5 |
| 5 php. SnOct plus, 0.1 php. Pb Stearate | do | 1.5 | 0.6 | None. |
| php. SnOct | None (Reference) | 1.2 | 0.4 | None. |

[1] Php.=parts per hundred of polyol.
[2] Phenylalphanaphthylamine.
[3] 2,2′-methylene bis(4-methyl-6-tertiarybutylphenol).
[4] 4,4′-methylene bis(2,6-ditertiarybutylphenol).
[5] A chelated stannous catalyst. (Nuoclex Products Co. Div. of Heyden-Newport Chemical Corp.)

Inasmuch as the substituted methylene bisphenols performed better as a class than the other proposed antioxidants the superiority of 2,2′-methylene bis(4-methyl-6-tertiarybutylphenol) over other members of the same class was demonstrated by formulating a representative polyol-stannous mixture using various methylene bisphenols. The premixtures comprised the propylene oxide adduct of glycerol having a hydroxyl number of 56 and stannous octoate in the amount of 0.4 part per hundred of polyol. The results reported in Table III illustrate the superiority of 2,2′-methylene bis(4-methyl-6-tertiarybutylphenol) over phenolic antioxidants of similar structure.

To further illustrate the stabilizing effect of 2,2′-methylene bis(4-methyl-6-tertiarybutylphenol) alone or together with other additives, the stability of a number of additional polyol-stannous catalyst mixtures were tested. The mixtures comprised the propylene oxide adduct of glycerol and stannous octoate in the amount of 0.4 parts per hundred by weight based upon the polyol. Results are tabulated in Table IIIA.

TABLE III.—EFFECTIVENESS OF VARIOUS METHYLENE BISPHENOL ANTIOXIDANTS

[Premix composition (Niax Triol LG-56) and 0.4 part per hundred stannous octoate]

Structure designation:

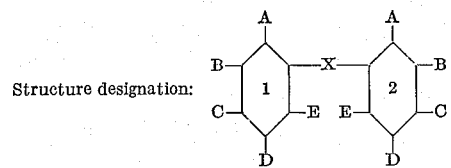

| Antioxidant | Additive According to Above Structure | | | | | | P.p.m. | Activity ×10² in min⁻¹ after— | | |
|---|---|---|---|---|---|---|---|---|---|---|
| | A | B | C | D | E | X | | 0 hrs. premix time | 24 hrs. premix time | 72 hrs. premix time |
| 2,2′-methylene bis(4-methyl-6-t-butylphenol) | OH | t-Bu | H | CH₃ | H | CH₂ | 500 | 3.8 | 3.3 | 3.0 |
| Antioxidant I | OH | t-Bu | H | t-Bu | CH₃ | CH₂ | 540 | 2.5 | 2.0 | 1.4 |
| Antioxidant II | OH | CH₃ | H | CH₃ | H | (CH₂)₂ | 560 | 2.9 | 2.3 | 1.6 |
| Antioxidant III | OH | CH₃ | H | CH₃ | H | (CH₂)₄ | 520 | 3.1 | 2.4 | 1.4 |
| Antioxidant IV | OH | CH₃ | H | t-Bu | CH₃ | CH₂ | 520 | 2.6 | 2.2 | 1.5 |
| Antioxidant V | OH | t-Bu | H | CH₃ | H | (CH₂)₄ | 510 | 3.2 | 2.6 | 1.8 |
| Antioxidant VI | OH | t-Bu | H | t-Bu | H | (CH₂)₄ | 520 | 2.4 | 1.8 | 1.3 |
| Antioxidant VII | H | t-Bu | OH | t-Bu | H | CH₂ | 490 | 3.4 | 2.9 | 2.6 |
| Antioxidant VIII | H | CH₃ | OH | CH₃ | H | (CH₂)₄ | 500 | 3.5 | 3.1 | 2.6 |
| Antioxidant IX[1] | H | t-Bu | OH | t-Bu | H | NHCO | 530 | 3.6 | 3.1 | 2.7 |
| No additive | | | | | | | | 2.4 | 1.7 | 1.1 |

[1] No substitution in ring 2.

TABLE III.A—EFFECTIVENESS OF 2,2′-METHYLENE BIS(4-METHYL-6-t-BUTYLPHENOL) ALONE OR WITH OTHER ADDITIVES

| Amount Antioxidant 2246,[1] p.p.m. | Other Additive | P.p.m. | Actixity ×10⁻² in min⁻¹ after— | | |
|---|---|---|---|---|---|
| | | | 0 hrs. premix time | 24 hrs. premix time | 72 hrs. premix time |
| 500 | None | | 4.0 | 3.5 | 3.1 |
| 1,000 | do | | 4.0 | 3.5 | 3.2 |
| 1,500 | do | | 3.6 | 3.1 | 2.9 |
| 500 | Ascorbic acid | 100 | 4.0 | 3.6 | 3.3 |
| 500 | do | 200 | 4.3 | 4.0 | 3.7 |
| 500 | do | 400 | 4.4 | 4.3 | 4.3 |
| 500 | 2,6-Ditertiarybutyl paracresol | 500 | 4.2 | 3.8 | 3.5 |

[1] 2,2′-methylene bis(4-methyl-6-tertiarybutylphenol).

Urethane premixes, as hereinbefore disclosed may contain other metal catalysts in addition to a stannous catalyst. For example, permixtures were prepared containing both stannous octoate and lead octoate in a polyethertriol having a molecular weight of about 3000 and a hydroxyl number of 56. It will be noted from the data in Table IV below that the lead octoate appears to have a stabilizing effect on the stannous octoate. However, greatly superior results are realized if 2,2'-methylene bis-(4-methyl-6-tertiarybutylphenol) (i.e., Antioxidant 2246) is employed.

The additive of this invention is, moreover compatible with other additives to yield stable premix composition.

TABLE V.—PREMIX STABILITY OF POLYOL CONTAINING OTHER ADDITIVES

| | Antioxidant 2246, p.p.m. | Premix Stability Time |
|---|---|---|
| Polyol A [1] | 0 | >180 min. <300 min. |
| Polyol A | 500 | >42 hours. |
| Polyol B [2] | 0 | >50 sec. <15 min. |
| Polyol B | 500 | >25 hours. |

[1] Polyol A is a 3,500 molecular weight polyol containing 1,000 p.p.m. 2,6-ditertbutyl-p-cresol and 20 p.p.m. $H_3PO_4$.
[2] Polyol B is a 3,500 molecular weight polyol containing 1,000 p.p.m. 2,6-ditertbutyl-p-cresol and 30 p.p.m. $H_3PO_4$.

TABLE IV.—PREMIX STABILITY OF STANNOUS/LEAD CATALYST IN POLYOL

[Php.=parts per hundred of polyol. P.p.m.=parts per million of polyol/catalyst mixture.]

| Stannous Octoate, php. | Lead Octoate, php. | Antioxidant 2246, p.p.m. | Activity ×10² in min.⁻¹ after— | | | |
|---|---|---|---|---|---|---|
| | | | 0 hrs. premix time | 25 hrs. premix time | 48 hrs. premix time | 72 hrs. premix time |
| 0.10 | 0.10 | | 2.00 | 1.53 | 1.07 | 0.63 |
| 0.15 | 0.10 | | 2.49 | 1.92 | 1.30 | 0.81 |
| 0.15 | 0.10 | 500 | 3.44 | 3.05 | 2.72 | 2.43 |
| 0.20 | 0.10 | | 3.01 | 2.36 | 1.73 | 1.27 |
| 0.20 | 0.10 | 500 | 3.79 | 3.28 | 2.92 | 2.67 |
| 0.10 | 0.15 | | 2.60 | 2.26 | 1.89 | 1.60 |
| 0.10 | 0.15 | 500 | 3.38 | 2.96 | 2.64 | 2.39 |
| 0.15 | 0.15 | | 3.02 | 2.62 | 2.23 | 1.77 |
| 0.10 | 0.20 | 500 | 3.74 | 3.32 | 3.01 | 2.80 |

Table V summarizes the effectiveness of 2,2'-methylene bis(4-methyl-6-tertiarybutylphenol) in premixes containing 0.2 php. stannous octoate catalyst. Values corresponding to premix stability were obtained by subjecting samples of given compositions to actual foaming tests.

Foams were prepared from the following formulation:

| | Phr. |
|---|---|
| Polyol | 100 |
| Silicone emulsifier [1] | 2.0 |
| Trichloromonofluoromethane | 4.0 premix |
| Lead octasol [2] | 0.05 |
| Stannous octoate | 0.20 |
| Water | 3.0 |
| TMBDA [3] | 0.05 |
| N-methyl morpholine | 0.50 |
| Toluene diisocyanate (TDI) 3% excess. | |

[1] Methyl disiloxane monobutoxy oxyethylene oxypropylene block copolymer.
[2] A 50 percent solution of lead octoate in light mineral oil.
[3] N,N,N',N'-tetramethylbutane diamine.

The components in the premix were mixed together and foamed at intervals, usually 1, 3, 5 and 24 hours after mixing. The water and amines were added with vigorous agitation and the mixture stirred for ten seconds. The TDI was then added and after 6 seconds, the mixture was poured into a suitable mold. The time required for the foam to reach its maximum height was noted. After a suitable cure period, the bun was cut and the foam quality noted. The length of storage time which could be undergone by the premixture before the splits appeared in the final foam bun was taken as the premix stability time.

To illustrate the adverse effects of oxidation of stannous catalysts upon the final foam product, polyol recipes not containing the antioxidant of this invention were compared with standard foam recipes. The polyol which was inhibited in accordance with this invention gave a good quality foam even after a 42 hour premix. The other polyols failed to give a satisfactory product after 18 hours of premix. The results are shown in Table VI.

The premix composition, foaming formulation and foaming techniques were the same as described above.

TABLE VI

| Premix Conditions [3] | Polyol A [1]; 15 p.p.m. $H_3PO_4$; 1,000 p.p.m. Antioxidant [2]; 25 p.p.m. phenothiazine | Polyol A; 20 p.p.m. $H_3PO_4$; 1,000 p.p.m. Antioxidant [2]; 500 p.p.m. Antioxidant 2246 [4] | Polyol X [5] |
|---|---|---|---|
| 1 hour premix time, Rise Time/Foam Quality | 118/Good | 120/Good | 122/Good. |
| 4 hours premix time, Rise Time/Foam Quality | 126/Good | 119/Good | 129/Good. |
| 18 hours premix time, Rise Time/Foam Quality | 130/Split | 123/Good | 138/Split. |
| 42 hours premix time, Rise Time/Foam Quality | | 126/Good | |

[1] A 3,500 molecular weight polyether triol.
[2] 2,6-di-t-butyl-p-cresol.
[3] Catalyst level was maintained constant at 0.20 php. for each polyol.
[4] 2,2'-methylene bis(4-methyl-6-tertiarybutylphenol).
[5] Inhibited polyol commercially available for urethane foaming.

What is claimed is:

1. A premix composition useful in the preparation of polyurethane foams which comprises a polyoxyalkylene polyol, a stannous salt of an acid selected from the group consisting of monocarboxylic acids and aminomonocarboxylic acids and a small amount of 2,2'-methylene bis-(4-methyl-6-tertiarybutylphenol) sufficient to inhibit the oxidation of the stannous salt to the stannic state.

2. A premix composition useful in the preparation of polyurethane foams which comprises a polyoxyalkylene polyol, a stannous salt of an acid selected from the group consisting of monocarboxylic acids and aminomonocarboxylic acids, and a small amount of an additive system consisting of 2,2'-methylene bis(4-methyl-6-tertiarybutylphenol) and 2,6-ditertiarybutyl-p-cresol sufficient to inhibit the oxidation of the stannous salt to the stannic state.

3. A premix composition useful in the preparation of polyurethane foams which comprises a polyoxyalkylene polyol, a stannous salt of a carboxylic acid, an emulsifier, a blowing agent and a small amount of 2,2'-methylene bis(4-methyl-6-tertiarybutylphenol) sufficient to inhibit the oxidation of the stannous salt to the stannic state.

4. The composition of claim 3 wherein the said stannous salt is stannous octoate.

5. A premix composition useful in the preparation of polyurethane foams which comprises a polyoxyalkylene polyol, a stannous salt of a carboxylic acid, an emulsifier, a blowing agent and a small amount of an additive system consisting of 2,2'-methylene bis(4-methyl-6-tertiarybutylphenol) and 2,6-ditertiarybutyl-p-cresol sufficient to inhibit the oxidation of the stannous salt to the stannic state.

6. A premix composition useful in the preparation of polyurethane foams which comprises a polyoxyalkylene polyol, a stannous salt of an acid selected from the group consisting of monocarboxylic acids and aminomonocarboxylic acids and a small amount of an additive system consisting of 2,2'-methylene bis(4-methyl-6-tertiarybutylphenol) and ascorbic acid sufficient to inhibit the oxidation of the stannous salt to the stannic state.

7. A premix composition useful in the preparation of polyurethane foams which comprises a polyoxyalkylene polyol, a stannous salt of a carboxylic acid, an emulsifier, a blowing agent and a small amount of an additive system consisting of 2,2'-methylene bis(4-methyl-6-tertiarybutylphenol) and ascorbic acid sufficient to inhibit the oxidation of the stannous salt to the stannic state.

References Cited by the Examiner

UNITED STATES PATENTS

| | | | |
|---|---|---|---|
| 2,942,033 | 6/1960 | Leis et al. | 260—611.5 |
| 3,032,571 | 5/1962 | Leebrick | 260—429.7 |
| 3,060,137 | 10/1962 | Gemeinhardt | 260—2.5 XR |

FOREIGN PATENTS 665,356    6/1963    Canada.

LEON J. BERCOVITZ, *Primary Examiner.*

DONALD E. CZAJA, *Examiner.*